Figure 1:
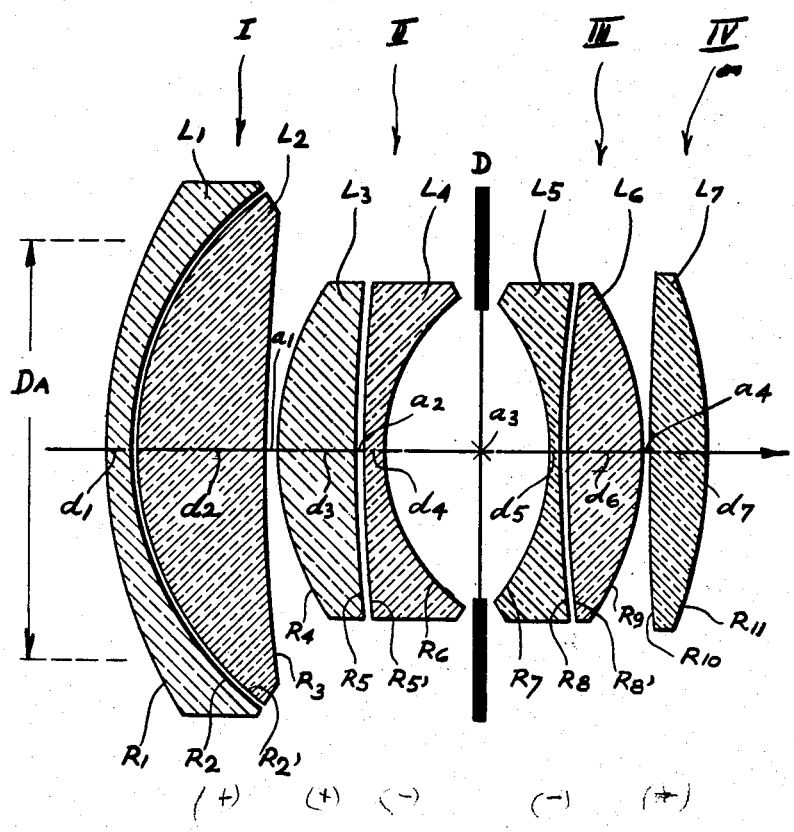

INVENTOR.
ALBRECHT WILHELM TRONNIER

July 28, 1953 A. W. TRONNIER 2,646,721
GAUSS TYPE PHOTOGRAPHIC OBJECTIVE HAVING TWO LENS
SYSTEMS ON OPPOSITE SIDES OF A DIAPHRAGM
Filed Sept. 12, 1950 2 Sheets-Sheet 2

INVENTOR.
ALBRECHT WILHELM TRONNIER
BY
ATTORNEYS.

Patented July 28, 1953

2,646,721

UNITED STATES PATENT OFFICE 2,646,721

GAUSS TYPE PHOTOGRAPHIC OBJECTIVE HAVING TWO LENS SYSTEMS ON OPPOSITE SIDES OF A DIAPHRAGM

Albrecht Wilhelm Tronnier, Gottingen, Germany, assignor to Voigtlander & Sohn Aktiengesellschaft, Braunschweig, Germany, a corporation of Germany Application September 12, 1950, Serial No. 184,456
In Switzerland January 16, 1950

3 Claims. (Cl. 88—57)

This invention relates to photographic objectives of very high light-transmitting capacity, showing anastigmatic image field flattening. These objectives belong to that specific group of the modified Gauss-type, in which two lens systems are arranged on opposite sides of an intermediately arranged diaphragm, the elements located on the side of the longer conjugate are shaped in the form of menisci, each pair of said elements is composed of lenses of opposite power, and the group in the immediate vicinity of the major conjugate comprises a very strongly curved vicinal pair of surfaces, which is convex relative to this major conjugate.

In objectives of this type, the lateral correction can be extended to a larger image field, without the other image defects or their zonal intermediate errors being essentially increased, even in the case of very large apertures, which exceed 1:1.6, if the curvature of the lens members of the objective is selected in a suitable manner. A structural design showing such selection of curvatures is described in my co-pending U. S. patent application for "Photographic Objective of High Light-Transmitting Capacity of the Gauss-Type" filed under Ser. No. 184,454 on September 12, 1950.

It is one object of the present invention to provide photographic objectives of the above-mentioned type, the photographic performance and the advantages of which are further improved and increased by a new distribution of the refraction indices of the glasses in combination with a specific distribution of curvatures in the two halves of the objective.

Another object of the invention is to provide new and improved objectives of the above type and structure, in which positive lenses of minimum thickness can be used.

Numerous other objects, advantages and features of this invention are set forth in the following description and the annexed drawings, which include a preferred example, to which the invention is not limited.

In the drawings,

Figure 1 is a vertical, axial section of the improved objective, taken along its optical axis. The horizontal optical axis is indicated by the horizontal arrow, which also indicates the direction of the light, from left to right. The object space is at the left of the objective, and the image space is at the right of the objective.

Figure 2:
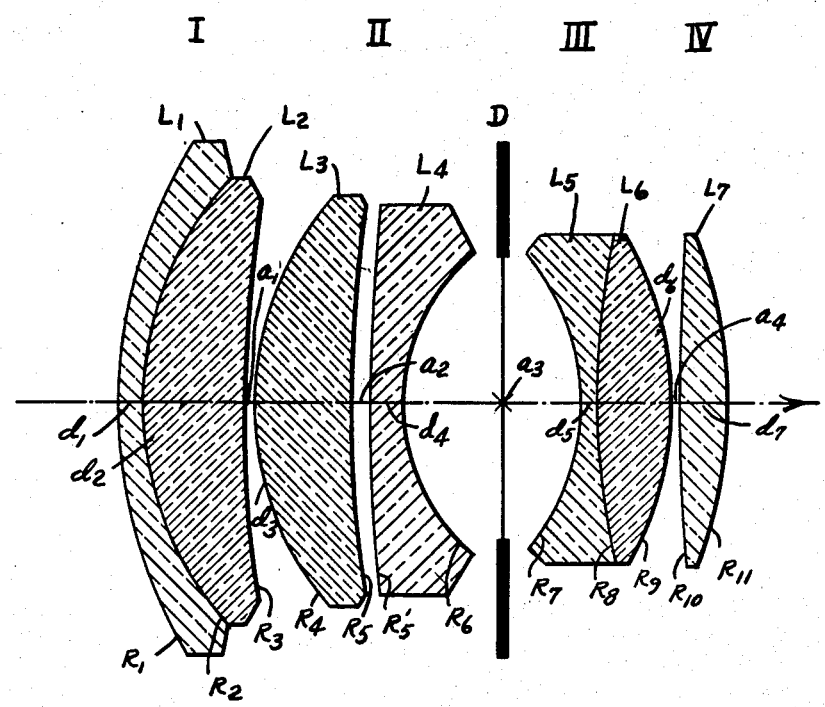

Figure 2 is a view substantially similar to that shown in Figure 1.

According to recent investigations made in connection with the present invention, the photographic performance of the objectives according to my above named co-pending patent application Ser. No. 184,454 can be further improved by a new and improved distribution of the refraction indices of the glasses within the total system of the objective in simultaneous combination with the distribution of curvatures in the two halves of the objective according to said co-pending patent application.

In my present invention the glasses within the total system of the objective are selected in such a manner that, on the one hand, in the front half of the objective the negative lens adjacent the diaphragm, which is the last lens of the front system in the meaning of the photographic picture, consists of a glass of very low refraction index, while the positive group which is located in the rear half of the objective on the side of the minor conjugate and terminates the total system of the objective in the same direction, has such a high refraction index that the difference between the mean refraction indices of these two outer rear lenses of the front lens system and rear lens system of the objective, is distinctly greater than 0.150. Simultaneously, at least one of the half objectives should show such a curvature that the sum of their outer radii is distinctly greater than 80% of the diameter of the initial aperture of the total objective without being greater than 180% of this diameter and, moreover, simultaneously the difference of the lengths of radii of said two outer surfaces of the front system and/or rear system of the total objective is distinctly smaller than 80% of the diameter of said initial aperture of the total system. The term initial aperture is used to denote the entrance aperture for rays, the diameter of which (considered for the distant object) is defined by the quotient of the equivalent focal length of the system and the number of the relative initial aperture, which is identical with the aperture number of the (maximum) relative aperture by which the maximum light-transmitting capacity of the objective is determined.

As such objectives of very high light-transmitting capacity show in general strong inner constriction of the rays, it is often of advantage to distribute the curvatures between the front system of lenses and rear system of lenses in such a manner that the quotient of the before-mentioned sums of the absolute values of the outer radii of the front system : rear system of lenses is greater than 1. This gives the possibility of using positive lenses of minimum thickness of glass even in the case of relative apertures which are distinctly greater than 1:1.5.

A further structural advantage can be additionally attained in the new objectives of the present invention in such a manner that, utilizing the mostly similar design of the meniscus-shaped converging lenses of the front system turned toward the side of the major conjugate, these two positive elements are made identically equal by the introduction of a uniform glass type. In this manner it is possible to render the production in series of the new objectives more economical by doubling the amount produced of these elements and thus simplify it with the exception of differences in diameter.

Referring now to the drawings in detail, in Figure 1 reference symbols I and II denote the two lens groups located on the side of the major conjugate, which form the front system and are followed on the other side of the diaphragm B by lens group III and lens IV, which form the rear system. The lenses are denoted $L_1$, $L_2$, $L_3$, $L_4$, $L_5$, $L_6$ and $L_7$. The radii of the lens surfaces are denoted from the left to the right $R_1$, $R_2$, $R_2'$, $R_3$, $R_4$, $R_5$, $R_5'$, $R_6$, $R_7$, $R_8$, $R_8'$, $R_9$, $R_{10}$ and $R_{11}$. Thus, the very strongly curved pair of adjacent surfaces between the menisci of opposite power of lens group I is denoted $R_2$ and $R_2'$. $d_1$, $d_2$, $d_3$, $d_4$, $d_5$, $d_6$ and $d_7$ denote the thickness of lenses $L_1$ to $L_7$, respectively. $a_1$ denotes the distance between lenses $L_2$ and $L_3$; $a_2$ the distance between lenses $L_3$ and $L_4$; $a_3$ the distance between lenses $L_4$ and $L_5$; and $a_4$ the distance between lenses $L_6$ and $L_7$. $D_A$ denotes the diameter of the initial front aperture. The thickness of the lenses ($d_1$ to $d_7$) and the distances of the lenses ($a_1$ to $a_4$) are measured on the horizontal optical axis.

Figure 2 illustrates an embodiment of the invention in the case of a focal length of f=150 mm. This embodiment corresponds in its structure to the following numerical example in which the focal length is equal to the unit. Correspondingly, all radii, thicknesses and distances refer to this unit. The glasses used are characterized by their mean refraction index $n_d$ for the yellow light of the helium spectrum, denoted consecutively $n_1$ to $n_7$ for lenses $L_1$ to $L_7$, while their mean color dispersion is characterized by the Abbe number V denoted consecutively $V_1$ to $V_7$ for lenses $L_1$ to $L_7$. The relative aperture of the example according to the following table is 1:1.5, which corresponds to a diameter of the initial aperture of 0.667 unit for the total objective having a focal length of 1.

The individual lens groups denoted in the drawing I, II, III and IV, meet the following requirements: The focal length $f_{1_2}$ of lens group I is in the range of 1.30 times and 2.60 times of the equivalent focal length F of the total objective; the focal length of lens group II $f_{3_4}$ is in the range of −2.50 times and −5.00 times F; the focal length of lens group III $f_{5_6}$ is in the range of −1.50 times and −3.50 times F, and the focal length of lens IV $f_7$ is in the range of 0.55 times and 0.95 times F.

Furthermore, the radii of curvature of the individual lens surfaces are in the following ranges:

$0.4\ F<R_1<0.9\ F$
$0.3\ F<R_2,R_2'<0.6\ F$
$0.6\ F<R_3<6.0\ F$
$0.3\ F<R_4<0.6\ F$
$0.6\ F<R_5,R_5'<6.0\ F$
$0.15\ F<R_6<0.45\ F$
$0.2\ F<-R_7<0.5\ F$
$\frac{1}{2}\ F<\pm R_8,R_8'<\infty$
$0.3\ F<-R_9<0.6\ F$
$\frac{1}{2}\ F<\pm R_{10}<\infty$
$0.4\ F<-R_{11}<0.9\ F$ The focal lengths of the lens groups forming the objective described in the following numerical example, are:

$f_{1_2}=+1.745$
$f_{3_4}=-3.175$
$f_{5_6}=-2.068$
$f_7=+0.700$

Numerical Example

[f=1.0   Relative Aperture 1:1.5]

| | | | |
|---|---|---|---|
| $R_1=+0.66609$ | $d_1=0.03364$ | $n_1=1.70315$ | $V_1=41.1$ |
| $R_2=R_2'=+0.41154$ | $d_2=0.13270$ | $n_2=1.62095$ | $V_2=60.3$ |
| $R_3=+1.96575$ | $a_1=0.01028$ | air | |
| $R_4=+0.41154$ | $d_3=0.13270$ | $n_3=1.62095$ | $V_3=60.3$ |
| $R_5=+1.96575$ | $a_2=0.01495$ | air | |
| $R_5'=+2.45896$ | $d_4=0.04859$ | $n_4=1.53250$ | $V_4=46.2$ |
| $R_6=+0.24988$ | $a_3=0.23362$ | air | diaphragm space |
| $R_7=-0.29417$ | $d_5=0.01962$ | $n_5=1.64783$ | $V_5=33.8$ |
| $R_8=R_8'=+0.98213$ | $d_6=0.09812$ | $n_6=1.61948$ | $V_6=60.4$ |
| $R_9=-0.41154$ | $a_4=0.00374$ | air | |
| $R_{10}=+2.45896$ | $d_7=0.06448$ | $n_7=1.70315$ | $V_7=41.1$ |
| $R_{11}=-0.60869$ | | | |

From the above it follows: $n_7-n_4=1.70315-1.53250=0.17065$, i. e. this difference of refraction indices is distinctly greater than 0.150.

The diameter of the initial aperture is $1:1.5=0.667$ and thus $0.80\times0.667=0.533$ and $1.80\times0.667=1.200$.

Thus, the following combinations result:

$R_1+R_6=0.66609+0.24988=0.91597$ and
$R_1-R_6=0.66609-0.24988=0.41621$

Moreover:

$R_{11}+R_7=0.60869+0.29417=0.90286$ and
$R_{11}-R_7=0.60869-0.29417=0.31452$ in absolute values.

$R_1+R_6=0.91597$ is distinctly greater than 0.533 and smaller than 1.200
$R_1-R_6=0.41621$ is distinctly smaller than 0.533
$R_{11}+R_7=0.90286$ abs. is distinctly greater than 0.533 and smaller than 1.200, in absolute calculation.
$R_{11}-R_7=0.31452$ abs. is distinctly smaller than 0.533

Furthermore:

$[R_1+R_6] : [R_{11}+R_7]=0.91597 : 0.90286$ (abs.) $=1.01452$, i. e. distinctly greater than 1.

The term "outer surface" is used in the present specification and claims to denote, in each lens system forming the front-half and rear-half of the objective, respectively, the first and last lens surface in the direction of the light, i. e. the surfaces having the radii $R_1$ and $R_6$ in the front system and the surfaces having the radii $R_7$ and $R_{11}$ in the rear system. The term "outer radii" is used to denote the radii of said outer surfaces.

A preferred embodiment of this invention has been described, but numerous changes, omissions, additions and substitutions can be made without departing from its scope.

As will be seen from the drawings in the embodiment shown in Figure 1 there is an air-space between lenses $L_1$ and $L_2$ and lenses $L_5$ and $L_6$, while in the embodiment shown in Fig. 2 the lens elements corresponding to $L_1$ and $L_2$ and those corresponding to $L_5$ and $L_6$ are cemented together. Both of these embodiments can be used in carrying out the present invention. The radii $R_2$ and $R_2'$ may have identical values and, likewise and independently, radii $R_3$ and $R_3'$ may also be equal, as shown in Fig. 2 and in the numerical example; in this latter case the beforementioned lens elements are cemented together. However, it is also possible that radii $R_2$ and $R_2'$ and/or radii $R_3$ and $R_3'$ show a slight difference and in such a case, as shown in Figure 1, $L_1$ and $L_2$ and $L_5$ and $L_6$ are not cemented together. Such variations can be made substantially without affecting the results obtained by the present invention.

What is claimed is:

1. Photographic objective of high light transmitting capacity and anastigmatic flattening of the image field, of the modified Gauss-type, said objective comprising in combination a first and second lens system, axially air spaced apart and arranged axially on opposite sides of an intermediately located diaphragm; said first lens system being arranged on the side of the major conjugate and consisting of a first meniscus-shaped outer lens pair and a second meniscus-shaped lens pair located between said first lens pair and the diaphragm; said first lens pair consisting of two menisci of opposite power, the first element, in the direction of light, of said first lens pair, being a strongly curved, diverging meniscus shaped lens, said second lens pair consisting likewise of two menisci of opposite power, and all radii of curvature of the menisci forming the first and second lens pair being concave relative to the diaphragm succeeding them; said second system of lenses being located on the side of the minor conjugate, consisting of a doublet member adjacent to the diaphragm and a single lens member following said doublet member and being an outer member of the total objective, said second system of lenses being a half objective of the conventional design of the Gauss-type; said first lens pair of the first lens system including a pair of vicinal surfaces which is convex relative to the major conjugate; the negative lens adjacent to the diaphragm, of the second lens pair in said first system of lenses, consisting of a glass of low refractive index, while the positive lens which is the last lens in the meaning of the photographic picture and terminates the total objective on the side of the minor conjugate, consists of a glass of high refraction index, the difference between the mean refraction indices of this negative lens and this positive lens, respectively, for light of the same color, being distinctly greater than 0.150; in at least one of said first and second system of lenses, the sum of radii of their outer surfaces being greater than 80% of the diameter of the initial aperture of the total objective and not greater than 180% of this diameter; the difference of the lengths of radii of said outer lens surfaces in at least one of said first and second system of lenses being distinctly smaller than 80% of the diameter of the initial aperture of the total objective.

2. Photographic objective of high light-transmitting capacity and anastigmatic flatness of the image field, of the modified Gauss-type, comprising two lens systems arranged on opposite sides of an intermediately located diaphragm and being composed of the following members successively arranged in the direction of the photographic image: (a) a front lens group consisting of two meniscus-shaped individual lenses of opposite power, which are both concave relative to the diaphragm, the proper focal length of this front lens group being in the range of 1.30 times and 2.60 times the equivalent focal length of the total objective; (b) a second lens group likewise consisting of two meniscus-shaped members of opposite power, the proper focal length of this second lens group being in the range of −2.50 times and −5.00 times the equivalent focal length of the total objective; (c) a lens group following the diaphragm and consisting of a first, diverging individual lens and second, collecting individual lens, the proper focal length of this lens group being in the range of −1.50 times and −3.50 times the equivalent focal length of the total objective; (d) an individual lens which terminates the objective on the image side, and the proper focal length of which is in the range of 0.55 times and 0.95 times the equivalent focal length of the total objective.

3. Photographic objective as claimed in claim 2, in which the radii of curvature of the individual refractive surfaces meet the following requirements:

$$0.4\ F < R_1 < 0.9\ F$$
$$0.3\ F < R_2, R_2' < 0.6\ F$$
$$0.6\ F < R_3 < 6.0\ F$$
$$0.3\ F < R_4 < 0.6\ F$$
$$0.6\ F < R_5, R_5' < 6.0\ F$$
$$0.15\ F < R_6 < 0.45\ F$$
$$0.2\ F < -R_7 < 0.5\ F$$
$$\tfrac{1}{2}\ F < \pm R_8, R_8' < \infty$$
$$0.3\ F < -R_9 < 0.6\ F$$
$$\tfrac{1}{2}\ F < \pm R_{10} < \infty$$
$$0.4\ F < -R_{11} < 0.9\ F$$

wherein $R_1$, $R_2$, $R_2'$, $R_3$, $R_4$, $R_5$, $R_5'$, $R_6$, $R_7$, $R_8$, $R_8'$, $R_9$, $R_{10}$, $R_{11}$, stand for the radii of curvature of the individual lens surfaces successively arranged in the direction to the photographic image and F stands for the equivalent focal length of the total objective.

ALBRECHT WILHELM TRONNIER.

References Cited in the file of this patent

UNITED STATES PATENTS

| Number | Name | Date |
|---|---|---|
| 2,171,641 | Berek | Sept. 5, 1939 |

FOREIGN PATENTS

| Number | Country | Date |
|---|---|---|
| 428,657 | Germany | May 10, 1926 |
| 439,556 | Germany | Jan. 13, 1927 |
| 665,520 | Germany | Sept. 27, 1938 |